2,896,912
Patented July 28, 1959

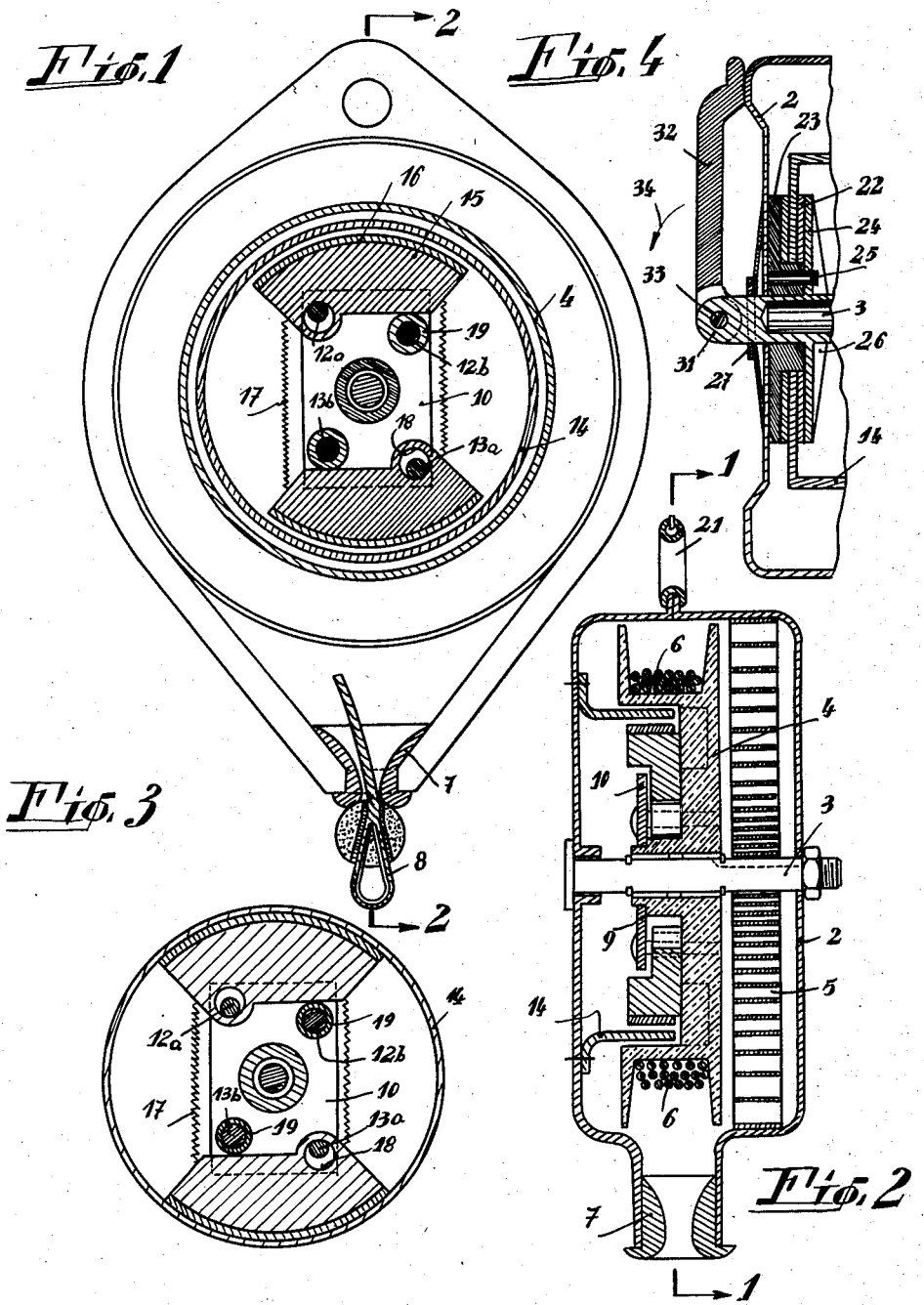

2,896,912

SAFETY APPARATUS

Gabriel Faugier, Bron, and Raymond Fertier, Lyon, France

Application November 9, 1956, Serial No. 621,449

Claims priority, application France November 15, 1955

3 Claims. (Cl. 254—159)

Our invention has for its object a safety apparatus adapted to brake and stop the free fall of a suspended load and in particular of a person working high above ground, as on a roof, a scaffolding or the like. Said apparatus is of the type comprising a casing adapted to be secured to a stationary member such as a wall or chimney and inside which is housed a reel or pulley upon which is wound a cable or rope one of the ends of which is secured to a person or to an object so as to prevent the latter from falling, while a spring provides for the rewinding of the cable or rope upon the pulley after use.

The novelty of our improved apparatus resides in the means used for braking the pulley in the case of a rapid unwinding of the cable or rope.

Our novel braking arrangement consists in the association of a stationary brake drum cooperating with at least one brake shoe having a braking surface formed as a sector of a circle, the shoe being subjected to the action of springs urging it away from the drum. The brake shoe is fitted over two elongated members or projections parallel with the axis of rotation of the pulley. The cable or rope is wound upon the drum and is rigid therewith. One of said projections passes with a clearance through an opening formed in said sector-shaped shoe while the other is located inside the inner edge of said shoe at a point such that in response to a sudden unwinding of the rope or cable, the combination of the inertia of the shoe provided by its clearance in the mounting together with the wedging action of said second projection engaging the inner edge of the shoe ensuring an almost instantaneous stopping and locking of the pulley through a wedging of said shoe between the brake drum and the two projections rigid with the pulley.

The two projections engaging the sector-shaped braking shoe are advantageously constituted respectively by a spindle passing with a clearance through an opening formed in the shoe and by a spindle carrying a roller engaged by the inner cam-like edge of the sector-shaped brake shoe, the two spindles extending between the body of the pulley and a supporting plate secured to the hub of said pulley.

In a preferred embodiment, the safety apparatus according to our invention includes two diametrically opposed sector-shaped brake shoes which are interconnected by two tension springs which yieldingly urge the two sector-shaped shoes away from the drum and towards each other.

Said drum may be permanently and rigidly secured to the casing of the apparatus or else it may be releasably connected to the latter through the agency of an adjustable friction clutch which permits the cable to be payed out at a controlled rate with the pulley and brake drum locked together.

We have illustrated by way of example in the accompanying drawings a preferred embodiment of our improved safety apparatus. In said drawings:

Figs. 1 and 2 are respectively cross-sectional views, through line 1—1 of Fig. 2 and line 2—2 of Fig. 1, of the apparatus with its brake released.

Fig. 3 is a fragmentary cross-section of the apparatus as shown in Fig. 1, except with the brake on.

Fig. 4 is a partial longitudinal cross-sectional view of a modification including a clutch for regulating the braking action.

In the apparatus illustrated in Figs. 1 to 3, the casing 2 includes two stamped sections between which is fitted revolubly a spindle 3 to which is keyed a peripherally grooved pulley 4, while one of the ends of a spirally wound spring 5 is secured to said spindle 3 and its other end is secured to the inner surface of the casing 2. Over the pulley 4 is wound a flexible tension member such as a cable 6 one of the ends of which is secured to the pulley while its other end passes out of the casing 2 through a guiding slot 7 and terminates with a spliced eye 8.

The pulley 4 includes a hub 9 (Fig. 2) over which is keyed a supporting plate 10 having a rectangular outline. Said plate allows securing between it and the flange of the pulley 4 spindles 12a, 12b, 13a, 13b (Fig. 1).

The casing 2 is rigid with a brake drum 14 the inner periphery of which is engaged by two shoes constituted each by a member 15 in the shape of a circular sector and covered by a lining 16. The two sector-shaped members 15 are interconnected by two helical tension springs 17 which urge them towards each other so as to hold them normally away from the drum 14.

Each sector-shaped shoe 15 is provided with a round transverse opening 18 which allows the passage through it with a clearance of a spindle, 12a or 13a for each shoe, while each of the two other spindles 12b and 13b carries a roller 19 engaging the inner edge of the corresponding shoe 15.

The apparatus described which is to protect a person against accidental falling is secured to any desired fixed support such as a chimney stack on the roof by a rope or the like passing through an eye 21 provided on the casing 2. The user of the apparatus secures to his belt the spliced eye 8 at the free end of the cable. The two shoes 15 being held in their released position (Figs. 1 and 2) by the springs 17 which balance the centrifugal force until the pulley 4 assumes a predetermined speed of rotation, the user may move freely and without any hindrance whatever since the cable 6 unwinds and the pulley revolves as soon as the user exerts tension on said cable 6. When, on the contrary, he no longer exerts any traction on the cable 6, in other words when he moves nearer the apparatus, the torsion spring 5 unwinds and makes the pulley 4 revolve in the opposite direction, thereby causing slack in the cable 6 to be taken up by reeling in the cable.

If the person secured to the apparatus should fall, this produces a sudden rotation of the pulley 4 rigid with the plate 10. Since the braking shoes 15 are fitted with some clearance over the spindles 12a and 13a, this leads to a lag in the drive provided by the pulley 4 and by the plate 10 and consequently we obtain thus a very rapid braking of the fall of the person secured to the apparatus by reason of the engagement of the sector-shaped shoes 15 against the drum 14; the rollers 19 wedge as a matter of fact the shoes against the drum 14 because, as a consequence of the lag in the driving of the shoes 15 by the pulley 4, the rollers 19 engage the inner surfaces of said shoes at points corresponding to parts of said shoes which have a greater thickness.

The apparatus, being held fast in its wedged position, as illustrated in Fig. 3, remains locked in this position as long as the user is suspended by the cable 6. It is then necessary to release the user by means of a ladder for instance.

However, in those cases where it is impossible to use a ladder, it is of advantage to associate with the safety apparatus which has been described means for temporarily releasing the drum 14 in order to allow a slow lowering of the person attached to the cable at a suitably controlled speed.

To this end, it is possible to employ the modified arrangement illustrated in Fig. 4. The brake drum 14 instead of being rigid with the casing 2 is revoluble and is fitted between two brake linings 22, the arrangement 14—22 being fitted between two discs 23 and 24. The disc 23 is rigid with the casing 2 and the disc 24 is adapted to move axially of the casing without being capable of rotation, as provided by the projections 25 raised on and rigid with the casing 2. Arms 26 carried by a longitudinally slidable hub 27 are drawn into engagement with the outer disc 24 through the agency of a cup spring 28 urged against the outer surface of the casing 2 by the stop 29 engaging a cam-shaped member 31 which forms the end of a lever 32 pivotally secured at 33 to the end of the hub 27.

It is readily apparent that by reason of the outline given to the cam 31, it is possible to modify the position given to the lever 32 so as to adjust the tractional action exerted on the hub 27 and consequently the pressure transmitted by the arms 26 on the disc 24; this shifting of the lever 32 allows therefore adjusting the intensity of braking of the drum 14 through the two linings 22.

When the user of the apparatus is stopped in his fall and while the drum 14 is locked in its position of maximum braking, it is therefore possible by shifting the lever 32 in the direction of the arrow 34 of Fig. 4 to gradually release the brake drum 14 so as to permit the cable 6 to be gradually payed out and make the person suspended by the apparatus move slowly at an adjustable speed down to the ground or any desired level.

What we claim is:

1. A safety apparatus including a casing adapted to be secured to a fixed support, a pulley revolubly fitted inside the casing, a return spring yieldingly urging the pulley into a predetermined angular starting position, an elongated flexible tension member wound upon the periphery of the pulley and one end of which is fixedly attached to the pulley, the other end of said tension member extending outwardly of the casing to carry a load, a stationary drum normally rigid with the casing and facing coaxially the pulley, two first projections rigid with the pulley and extending parallel to the rotational axis of the pulley and arranged symmetrically to either side of said axis, two second projections rigid with the pulley, also extending parallel to the axis of the pulley and arranged symmetrically to either side of said axis, the distances between the first projections and the axis of the pulley approximating those between the second projections and said axis, two symmetrically designed brake shoes mounted freely inside the drum, each brake shoe being carried by one of said first and one of said second projections, said shoes having inner substantially plane surfaces extending approximately between the corresponding first and second projections and slidingly engaging the corresponding first projection on the side thereof facing away from the center of the pulley, said shoes having furthermore an outer substantially part cylindrical braking surface normally slightly eccentric with reference to the inner surface of the drum and separated from the latter by a narrow gap, each shoe being provided with a substantially round recess fitted with some play over the corresponding second projection, springs urging the two shoes towards each other to normally provide for contact between the second projections and the outer surfaces of the recesses in the corresponding shoes, the rotation of the pulley at a speed above a predetermined value providing for a shifting and slightly tilting movement of the shoes under the action of their inertia over the corresponding first projections bringing said braking surfaces into wedging coaxial engagement with the inner periphery of the drum.

2. A safety apparatus including a casing adapted to be secured to a fixed support, a pulley revolubly fitted inside the casing and including a hub, a plate rigid with the hub and extending perpendicularly to the axis of the pulley, a return spring urging the pulley into a predetermined angular starting position, an elongated flexible tension member wound upon the periphery of the pulley, and one end of which is attached to the pulley, the other end of the tension member extending outwardly of the casing to carry a load, a stationary drum normally rigid with the casing and facing coaxially the pulley, two first projections carried rigidly between the pulley body and the plate rigid with the pulley hub, said projection extending parallel to the axis of the pulley and being arranged symmetrically to either side of said axis, two second projections carried rigidly between the pulley body and the plate rigid with the pulley hub, said second projections extending parallel to the axis of the pulley and being arranged symmetrically to either side of said axis, the distances between the first projections and the axis of the pulley approximating those between the second projections and said axis, two symmetrically disposed brake shoes mounted freely inside the drum, each brake shoe being carried by one of said first and one of said second projections, said shoes having inner substantially plane surfaces extending approximately between the corresponding first and second projections and slidingly engaging the corresponding first projections on the side thereof facing away from the center of the pulley, each of said shoes having furthermore an outer substantially part cylindrical braking surface normally slightly eccentric with reference to the inner surface of the drum and separated from the latter by a narrow gap, each shoe being provided with a substantially round recess fitted with some play over the corresponding second projection, spring means urging the two shoes towards each other to normally provide for contact between the second projections and the outer surfaces of the recesses in the corresponding shoes, the rotation of the pulley at a speed above a predetermined value producing a shifting and slightly tilting movement of the shoes under the action of their inertia over the corresponding first projections bringing said braking surfaces into wedging coaxial engagement with the inner periphery of the drum.

3. A safety apparatus including a casing adapted to be secured to a stationary point, a pulley revolubly fitted inside the casing, a return spring urging the pulley into a predetermined angular starting position, an elongated flexible tension member wound upon the periphery of the pulley and one end of which is attached to the pulley, the other end of the tension member extending outwardly of the casing to carry a load, a normally stationary drum revolubly mounted in said casing and facing coaxially the pulley, two first projections rigid with the pulley and extending parallel with the axis of the pulley and arranged symmetrically to either side of said axis, two second projections rigid with the pulley, also extending parallel with the axis of the pulley and arranged symmetrically to either side of said axis, the distances between the first projections and the axis of the pulley approximating those between the second projections and said axis, two symmetrically designed brake shoes mounted freely inside the drum, each brake shoe being carried by one of said first and one of said second projections, said shoes having inner substantially plane surfaces extending approximately between the corresponding first and second projections and slidingly engaging the corresponding first projections on the side thereof facing away from the center of the pulley, said shoes having furthermore an outer substantially part cylindrical braking surface normally slightly eccentric with reference to the inner surface of the drum and separated from the latter by a narrow gap, each shoe being provided with a substantially round recess fitted with some play over the corresponding second projection, spring means urging the two shoes towards each other to normally provide for contact between the second projections and the outer surfaces of the recesses in the corresponding shoes, the rotation of the pulley at a speed above a predetermined value providing for a shifting and slightly tilting movement of the shoes under the action of their inertia over the corresponding first projections bringing said braking surfaces into wedging coaxial engagement with the inner periphery of the drum and a clutch releasably holding said drum against rotation, said clutch including a member coaxially slidable with reference to the drum and held against rotation, a spring urging said slidable member into a position of maximum friction in contact with the drum, and a hand-operable lever pivotally secured to said slidable member, movement of said lever adjustably stressing the spring to vary the force acting on the slidable member by a corresponding extent and thus vary the friction between said slidable member and the drum.

References Cited in the file of this patent

UNITED STATES PATENTS

| | | |
|---|---|---|
| 1,659,259 | Grout | Feb. 14, 1928 |
| 1,904,089 | Schwerin | Apr. 18, 1933 |
| 2,546,202 | Trouin | Mar. 27, 1951 |
| 2,587,652 | Rostine | Mar. 4, 1952 |
| 2,761,650 | Faugier | Sept. 4, 1956 |

FOREIGN PATENTS

| | | |
|---|---|---|
| 669,438 | Great Britain | Apr. 2, 1952 |